Sept. 21, 1926.
T. DAVIS
FLUSH TANK VALVE
Filed Feb. 26, 1923
1,600,455
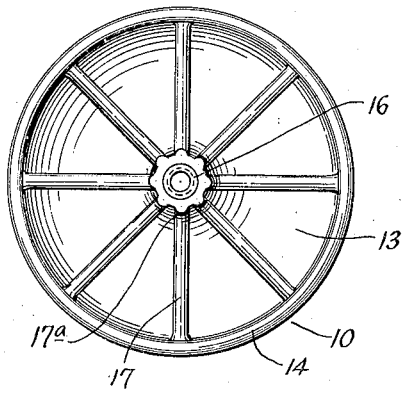
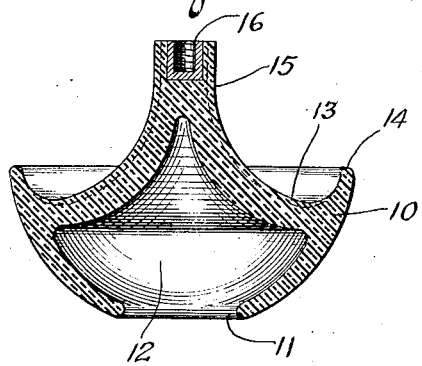
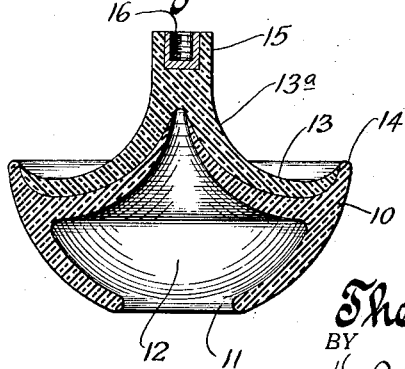
INVENTOR
Theron Davis
BY
W. B. Hutchinson,
ATTORNEY Patented Sept. 21, 1926.

1,600,455

UNITED STATES PATENT OFFICE.

THERON DAVIS, OF NEW YORK, N. Y., ASSIGNOR TO THE B. F. GOODRICH COMPANY, OF NEW YORK, N. Y., A CORPORATION OF NEW YORK.

FLUSH-TANK VALVE.

Application filed February 26, 1923. Serial No. 621,334.

The object of my invention is to produce a valve for use in toilet tanks and the like, that will be more efficient and durable, cheaper in construction, use less rubber material, and be easier to make. A further object of my invention is to produce a valve requiring less force to unseat it than the usual type of valve. A still further object of my invention is to produce a valve in which the surfaces for seating can be made of a much better class of rubber material than the portions of the valve that are subject to no strain or wear.

I accomplish this result by forming the lower portion of the valve substantially like the lower half of an ordinary tank ball, and combining it with a novel shape of upper portion in a new and useful manner, as will hereinafter appear. The interior is formed around a metal core, making a cavity within the lower half of the valve. This not only lightens the valve and saves rubber material, but also forms an air pocket that tends to prevent the valve from seating before the water in the tank has passed out. A covering extends over the lower half of the valve from the center of which is a post of rubber material extending upward. In the end of this post is a spud such as is ordinarily used in tank balls to engage a suspending rod. The sides of this post may have ribs to give it additional strength, and the surface of the upper part of the valve can also be made with small ribs extending to the exterior circumference so as to prevent the valve from buckling. When in use this valve is seated in an outlet. The edges of the outlet have a sloping surface, and it will be apparent that the weight of the water upon this valve as well as the flexibility of the valve, will cause it to seat more firmly than if the sides of the valve were rigid. All of which will be more clearly understood from the description which follows.

Reference is to be had to the accompanying drawings forming a part of this specification, in which similar reference characters indicate corresponding parts in all the views.

Figure 1 is a plan view of the valve embodying by invention.

Figure 2 is a vertical cross section thereof, and

Figure 3 is a vertical cross section showing a slight modification,

The drawings are by way of example, and it will be understood from the description which follows that the particular form of parts of the valve can be departed from without affecting the invention.

As illustrated the valve 10 is made of rubber suitably vulcanized, and it is of the general shape of a semi-sphere, the rubber part being circular in cross section, especially through all the parts which are likely to engage the usual seat. The valve is made preferably with an opening 11 in the bottom, and with the middle portion chambered out as shown at 12. This makes the valve lighter, requires much less material, and it also makes the valve body more flexible so that it will seat more perfectly. Furthermore, I prefer to have the valve open in the bottom and chambered more or less, because this offers resistance to the water which rushes into it, so that the valve will not seat too quickly; but it will be understood that this internal chamber may be of any desired form. It is better to have the lower portion of the valve provided with a substantial opening 11 and with the chamber 12 also of sufficient size to increase the resiliency of the part 10 of the ball because when thus constructed, the pressure of the water upon the upper part of the ball has a tendency to force the said upper part of the ball downward into the chamber 12, thereby expanding the soft lower portion of the valve against its seat and making the closure more certain.

The valve has a suitable top 13 which is preferably concave, and is formed with a circumferential lip 14 at the valve top, which will come above the usual seat, and thus the pressure of the water on the top of the valve will serve to hold it firmly to its seat, and also will have an expansive action against the lip 14, so that the upper part of the valve will be forced out above the seat, making leakage practically impossible.

The concave top 13 of the valve merges into a post or stem 15, which can be higher or lower as desired, and this has in the top a spud 16 of the usual or any preferred kind, which is adapted to connect with a rod or wire in the ordinary way to operate the valve, but it will be understood that instead of the spud shown, any preferred means of connecting with a working rod or wire can be used. While the valve may be made with a plain top and plain post, I prefer to have radial ribs 17 formed on the top of the valve, and these merge into ribs 17ª extending up the sides of the post. By ribbing the top of the structure and the post, lighter material may be used, and the necessary strength still retained.

In Figure 3 I have shown a slight modification of the structure, in which the form is kept, but the top 13 can be tapered off to the center and reinforced by a supplemental top 13ª of cheaper and harder material, and this can be formed into a post 15 as already described.

It will also be understood that the essential thing is the construction of the valve body along the lines indicated, and the form of post may be departed from, and any suitable connection made with the valve to permit it to be operated, that is, raised when desired, and allowed to drop at the requisite time.

The general practice has been to make valves for this purpose in the form of a ball, but this requires more material, is difficult of vulcanization because of its hollow and generally spherical shape, and moreover, it is apt to become elongated and distorted in use, difficulties which are overcome by my improved construction.

The top is depressed as compared with the ordinary valve tops instead of being convex, and is preferably somewhat concave independently of the lip 14, so that material is saved, and the pressure of water will have a better effect on the valve and tend to expand it against its seat.

It will be noted that the diameter of the base of the top 13, where it joins the convex or hemispherical seating portion, is at least twice (in this instance more than four times) as great as the diameter of the truncated upper end of post or stem 15, said top, including the post, having a pronounced spread from the spud 16, downwardly and outwardly to said seating portion. When an upward lifting force is exerted on said spud, there is thus developed (especially in the form of my invention shown in Figs. 1 and 2) a substantial horizontal, inwardly-acting component of said force which tends to contract the seating zone and progressively break the adhesion of the valve to its seat, the lip acting as a sort of fulcrum which tends to tip outwardly in response to said force when opposed by the resistance of the valve to being unseated. It has been found that this action reduces the amount of force required to unseat the valve.

I do not claim broadly the use of a circumferential lip such as 14, in a buoyant, flexible rubber valve of general mushroom shape.

I claim:—

1. A flush tank valve having a convex, flexible, soft rubber lower or seating portion with a downwardly open chamber therein, a concave top, and an upwardly-projecting, flexible circumferential lip at the upper edge.

2. A hollow flush tank valve, having a convex bottom with an opening therein, the seating portion of the valve being of a soft and elastic material, and the upper section being depressed and of a cheaper and harder material.

3. A hollow flush-tank valve of flexible, soft-rubber construction having a convex lower portion provided with an upwardly-projecting, outer marginal flange, and a top portion whose diameter at its junction with the lower portion is at least twice as great as the diameter of its upper end.

4. A hollow, buoyant flush-tank valve having a flexible, convex lower or seating portion provided with an upwardly-projecting, outer marginal flange, and a top portion of stiffer construction than said lower portion, joined thereto below the upper edge of said flange and rising above said upper edge.

THERON DAVIS.